(12) United States Patent
Yasukochi et al.

(10) Patent No.: US 11,577,353 B2
(45) Date of Patent: Feb. 14, 2023

(54) MACHINING PROGRAM GENERATION DEVICE AND MACHINING METHOD

(71) Applicant: MAKINO MILLING MACHINE CO., LTD., Tokyo (JP)

(72) Inventors: Jiro Yasukochi, Meguro-ku (JP); Yasunori Masumiya, Aiko-gun (JP); Kyohei Suzuki, Aiko-gun (JP)

(73) Assignee: Makino Milling Machine Co., Ltd., Tokyo (JP)

(*) Notice: Subject to any disclaimer, the term of this patent is extended or adjusted under 35 U.S.C. 154(b) by 1067 days.

(21) Appl. No.: 16/318,065

(22) PCT Filed: Jul. 15, 2016

(86) PCT No.: PCT/JP2016/071065
§ 371 (c)(1),
(2) Date: Jan. 15, 2019

(87) PCT Pub. No.: WO2018/011990
PCT Pub. Date: Jan. 18, 2018

(65) Prior Publication Data
US 2021/0276137 A1    Sep. 9, 2021

(51) Int. Cl.
| | | |
|---|---|---|
| *B23Q 15/22* | (2006.01) |
| *B23Q 15/26* | (2006.01) |
| *G05B 19/4093* | (2006.01) |
| *G05B 19/416* | (2006.01) |
| *B23Q 17/20* | (2006.01) |
| *B23Q 17/22* | (2006.01) |

(52) U.S. Cl.
CPC ............ *B23Q 15/225* (2013.01); *B23Q 15/26* (2013.01); *B23Q 17/20* (2013.01); *B23Q 17/2266* (2013.01); *G05B 19/4093* (2013.01); *G05B 19/40937* (2013.01); *G05B 19/4163* (2013.01)

(58) Field of Classification Search
None
See application file for complete search history.

(56) References Cited

U.S. PATENT DOCUMENTS

| | | |
|---|---|---|
| 6,535,788 B1 | 3/2003 | Yoshida et al. |
| 2013/0336736 A1 | 12/2013 | Kataoka et al. |
| 2014/0180465 A1 | 6/2014 | Nakano et al. |

FOREIGN PATENT DOCUMENTS

| | | | |
|---|---|---|---|
| CN | 103201069 A | 7/2013 | |
| CN | 103901818 A | 7/2014 | |
| JP | 10-151511 | 6/1998 | |
| JP | 2001-9672 | 1/2001 | |
| JP | 3916260 B2 * | 5/2007 | ....... G05B 19/40932 |

(Continued)

*Primary Examiner* — Ryan A Jarrett
(74) *Attorney, Agent, or Firm* — Morrison & Foerster LLP

(57) ABSTRACT

This machining program generation device is provided with: a storage unit that stores machining conditions for respective tool regions determined on the basis of the number of effective edges in a multi-blade tool; a contact region calculation unit that calculates a tool region which comes into contact with a workpiece during machining on the basis of the shapes of the workpiece and the edge portion of the tool and of a tool path; and a machining program generation unit that generates a machining program on the basis of the tool path and the machining conditions stored in the storage unit in association with the tool region coming into contact with the workpiece.

6 Claims, 5 Drawing Sheets

(56) References Cited

FOREIGN PATENT DOCUMENTS

| | | |
|---|---|---|
| JP | 5204934 B1 | 6/2013 |
| KR | 2001-0032067 | 4/2001 |
| KR | 2004-0009568 | 1/2004 |

* cited by examiner

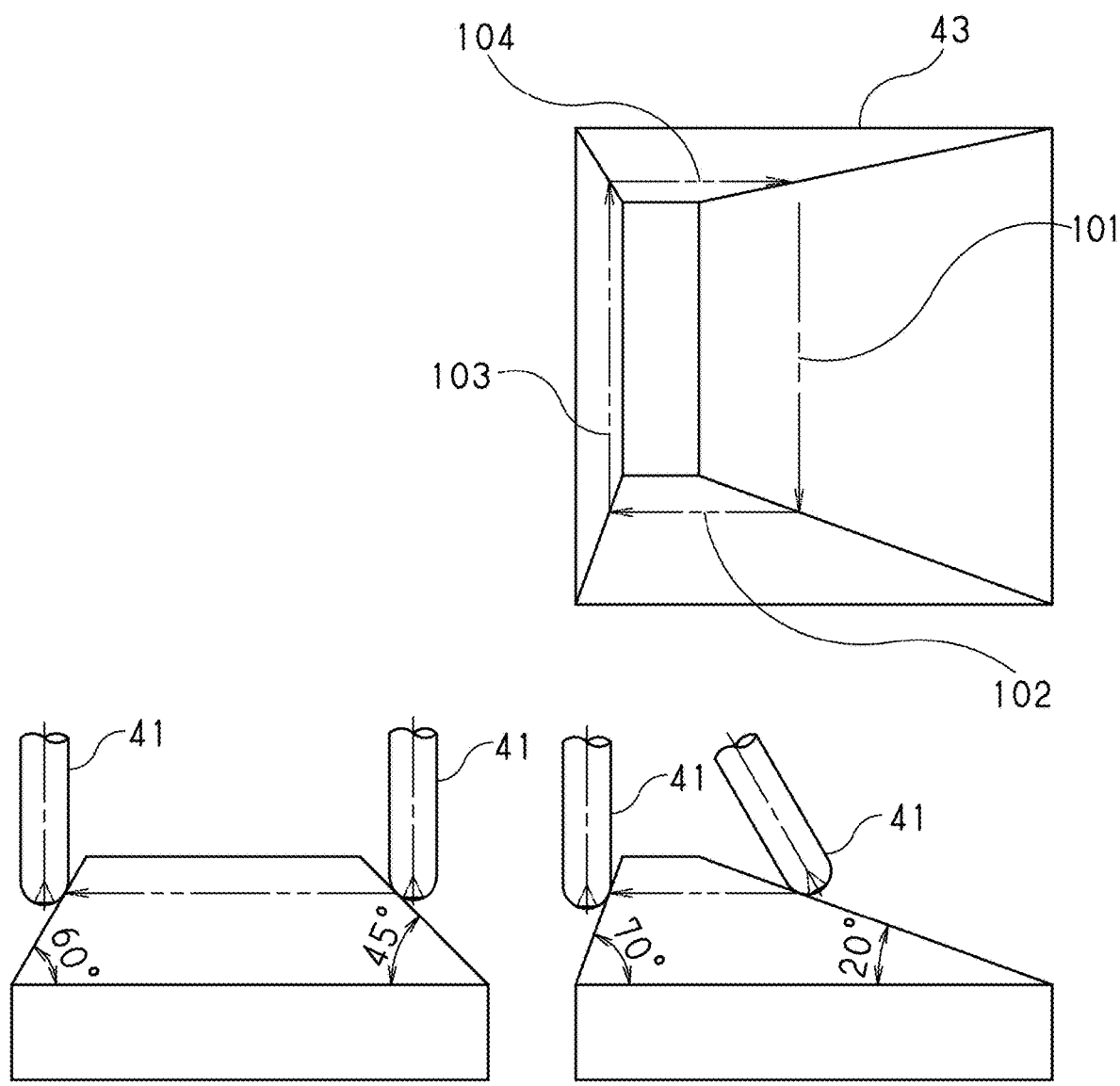

MACHINING PROGRAM GENERATION DEVICE AND MACHINING METHOD

CROSS REFERENCE TO RELATED APPLICATIONS

This application is a U.S. National phase patent application of International Patent Application No. PCT/JP2016/071065, filed Jul. 15, 2016, the contents of which are hereby incorporated by reference in the present disclosure in its entirety.

FIELD OF THE INVENTION

The present invention relates to a machining program generation device generating a machining program for machining a workpiece by an NC machine tool and a machining method using the same.

BACKGROUND OF THE INVENTION

An NC machine tool receives machining commands input by a machining program and performs machining by driving feed axes or a main spindle in accordance with the input machining commands. The machining program is written by coordinates X, Y, Z, A, and C of the feed axes showing the path for movement of the tool, F-codes showing the feed speeds of the feed axes, S-codes showing the rotational speed of the main spindle, etc. Even in the case of the same machine tool machining the same shape of workpiece, the machining program will not be written the same. Various machining programs may be considered. Depending on the quality of the final product of the machining program, the time for the NC machine tool to machine the workpiece or the precision of the workpiece will change. Further, unless suitably writing the machining program corresponding to the tool used for the machining, the tool performance cannot be made complete use of.

PTL 1 discloses a numerical control device making the amount of movement per cutting edge constant and making a relative speed between a tool and a contact point of a workpiece constant so as to efficiently machine a workpiece by an NC machine tool.

PTL 2 discloses a ball end mill having six cutting edges which includes two cutting edges providing bottom cutting edges at a nose part and another four cutting edges minus portions corresponding to the lengths of the bottom cutting edges.

PATENT LITERATURE

[PTL 1] Japanese Unexamined Patent Publication No. 2001-9672
[PTL 2] Japanese Unexamined Patent Publication No. 10-151511

BRIEF SUMMARY OF THE INVENTION

An NC machine tool receives machining commands from a machining program. In the machining program, it is necessary to write commands of the feed speeds by F-codes and commands of the rotational speeds of the tool by S-codes in advance in the machining program.

The invention described in PTL 1 successively calculates the feed speeds and the rotational speeds of the tool while performing machining. In this system, the load in calculation at the NC machine tool increases, more calculation time is taken, and the machining becomes slower. Further, in PTL 1, a tool changing in number of edges like the ball end mill with multiple edges of PTL 2 is not considered. For this reason, in the NC device of PTL 1, even if using the multi-edge ball end mill of PTL 2, it is necessary to perform the machining by the machining conditions of a slow feed speed giving the smallest machining load among the different portions of the tool.

The present invention is made in consideration of the above situation and has as its object to provide a machining program generation device generating a machining program able to shorten the machining time when using an end mill tool with multiple cutting edges and a machining method using the same.

To achieve the above object, there is provided a machining program generation device generating a machining program machining a workpiece using a tool having a plurality of cutting edges, the machining program generation device comprising a storage unit storing a machining condition for each region of the tool set based on the number of effective edges of each portion of the tool, a contact region calculation unit calculating a region of the tool contacting the workpiece at the time of machining from a shape of the workpiece, a shape of an edge part of the tool and a tool path, and a machining program generation unit generating a machining program based on the machining condition stored in the storage unit and the tool path corresponding to the region of the tool contacting the workpiece calculated by the contact region calculation unit.

Due to this, when using a ball end mill with multiple cutting edges like in PTL 2, there are six cutting edges (effective edges) at portions off from the rotational center. When machining by the six edge portions, it is possible to increase the amount of cutting per unit time by exactly the amount of the greater number of effective edges. In other words, by increasing the number of effective edges, the amount of cutting per cutting edge is reduced and it becomes possible to increase the feed speed by exactly that decrease and increase the amount of cutting per cutting edge. If the feed speed rises, the machining time is shortened. However, at a portion near the rotational center side, there are only two cutting edges, so the load applied to the cutting edges per cutting edge becomes larger. If machining by the same machining conditions at the portions of the six effective edges, chipping easily occurs. When used for machining, which of the portion of two edges and the portion of six edges to use cannot be determined, so it is necessary to match the feed speed and other machining conditions with conditions which the two edges can withstand so that the tool will not be damaged even if machining is performed by the portion of two edges. In the present invention, the machining conditions are stored for each region of the tool set based on the number of effective edges of each portion of the tool, so the optimum machining conditions can be set.

There is also provided a machining method machining a workpiece using a tool having a plurality of cutting edges, the machining method comprising determining machining conditions for each region of the tool set based on the number of effective edges of each portion of the tool and machining the workpiece using machining conditions corresponding to the region of the tool contacting the workpiece.

According to the present invention, the optimal machining conditions for a region with a large number of effective edges of a tool and a region with a small number of effective edges of the tool are set, so it is possible to shorten the machining time without causing damage to the tool.

BRIEF DESCRIPTION OF THE DRAWINGS

FIG. 5 is a view schematically showing movement of a tool in a case of working the present invention while changing the posture of the tool.

DETAILED DESCRIPTION OF THE INVENTION

Figure 1:
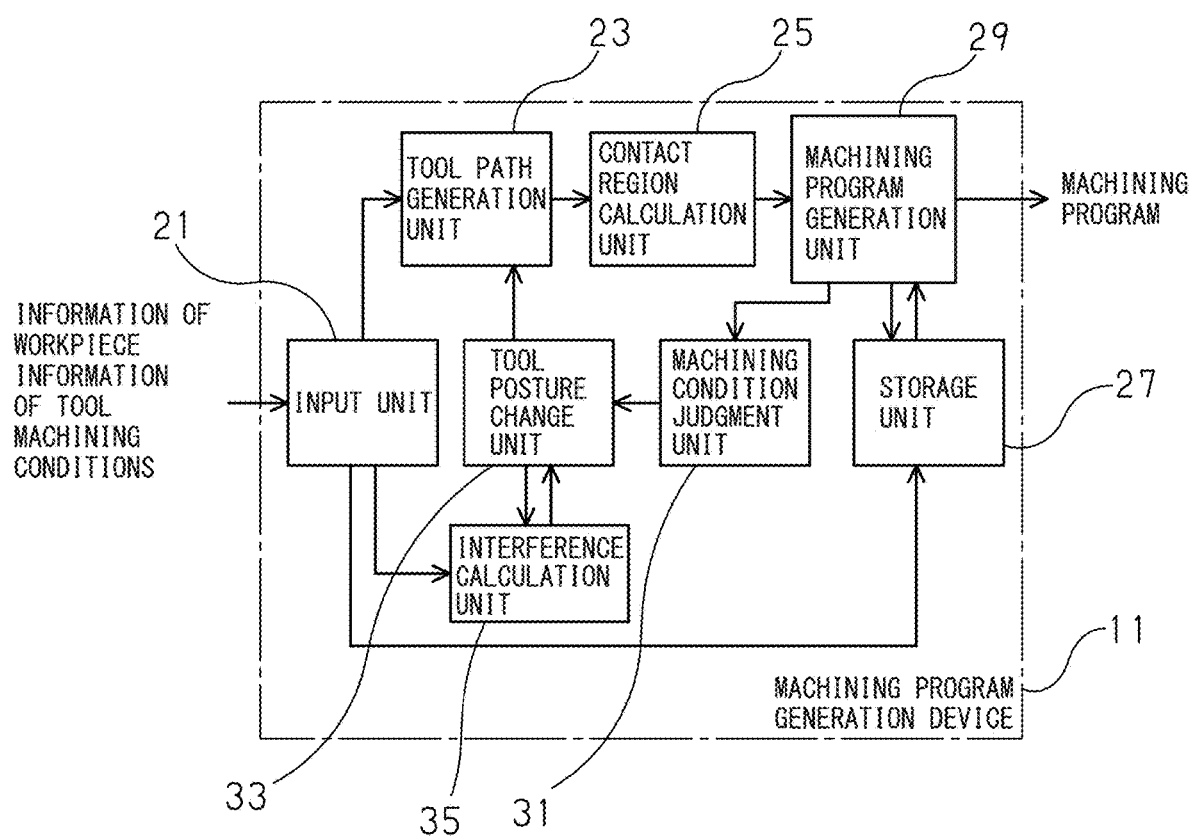
FIG. 1 is a block diagram of a machining program generation device showing an embodiment of the present invention.

FIG. 1 shows a machining program generation device 11 of the present invention. As a typical example of a machining program generation device 11, a CAM (computer aided manufacturing) system is known.

The machining program generation device 11 is provided with an input unit 21. The operator inputs information on the workpiece, information of the tool, machining conditions, etc. from the input unit 21 to the machining program generation device 11. As the information of the workpiece, there are the shape of the workpiece after finishing machining, the shape of the material of the workpiece before machining, the mounting position of the workpiece, the material of the workpiece, and the dimensions of the mounting fittings. As the information of the tool, there are the diameter or length or other dimensions of the shape of the tool, the optimum cutting speed for each material of the workpiece, the number of effective edges at each portion, the ranges of the regions of the tool, and the dimensions of the tool holder. The machining conditions include the relative feed speed between the tool and workpiece, the rotational speed of the tool, the amount of feed per cutting edge, the depth of cut, the amount of pick feed, and the scan pattern of the tool with respect to the workpiece. The information of the machine tool includes the strokes of the X-, Y-, Z-, A-, and C-axes, the maximum feed speeds of the feed axes, the maximum rotational speed of the main spindle, and the shape dimensions around the main spindle and around the table stored in advance in the storage unit 27.

The machining program generation device 11 is provided with a tool path generation unit 23. The tool path generation unit 23 finds the tool path of the path of movement of the tool when a rotating tool creates the shape of a workpiece based on the information input from the input unit 21.

The machining program generation device 11 is provided with a contact region calculation unit 25. The contact region calculation unit 25 determines which region of the tool to contact to cut a workpiece to create a machined surface at each position on the tool path based on the tool path generated by the tool path generation unit 23 and the information input from the input unit 21.

The machining program generation device 11 is provided with a storage unit 27. The storage unit 27 stores machining conditions input from the input unit. The machining conditions are linked with each region of the tool. In the storage unit 27, machining conditions suited for each region of the tool are individually stored. The machining conditions are stored for each tool and for each type of machining such as rough machining and final machining.

The machining program generation device 11 is provided with a machining program generation unit 29. The machining program generation unit 29 converts the tool path generated by the tool path generation unit 23 to a machining program written in X-, Y-, Z-, A-, and C-coordinate values able to be deciphered by the NC device 71. Further, based on the contact region of the tool creating the machined surface specified by the contact region calculation unit 25, it extracts corresponding machining conditions from machining conditions stored for each contact region of the tool in the storage unit 27 and inputs the machining conditions by means such as the F-codes (commands of feed axis speeds) and S-codes (commands of spindle rotational speeds) to the machining program. The machining program generation unit 29 inputs the machining conditions to the machining program, then outputs the machining program.

The machining program generation device 11 is provided with a machining condition judgment unit 31. The machining condition judgment unit 31 judges if the machining conditions which the machining program generation unit 29 extracts from the storage unit 27 are machining conditions where machining time becomes shorter or the machining conditions where the machining time becomes longer among the machining conditions for each region of the tool stored in the storage unit 27. The machining condition judgment unit 31 searches for locations of the machining conditions where the machining time becomes longer in the tool path.

The machining program generation device 11 is provided with a tool posture change unit 33. The tool posture change unit 33 changes the tool posture at a location of the machining conditions where the machining time becomes longer found by the machining condition judgment unit 31. The tool posture change unit 33 operates the A-axis or C-axis so that the tool posture becomes one where machining is performed by a region of the tool where machining conditions where the machining time becomes shorter are set. Simultaneously, the tool posture change unit 33 makes the X-, Y-, and Z-axes move so that the location at which the workpiece is machined does not change. Then, the tool path generation unit 23 regenerates the tool path based on the change by the tool posture change unit 33. Here, the "tool posture" is the angle formed by the axis of the tool 41 and the machined surface of the workpiece 43. The axis of the tool 41 may be tilted or the table 67 on which the workpiece 43 is attached may be tilted.

The machining program generation device 11 is provided with an interference calculation unit 35. The interference calculation unit 35 reads the information of the shape around the main spindle from the storage unit 27. The interference calculation unit 35 also reads the tool posture which the tool posture change unit 33 newly sets. Further, the interference calculation unit 35 receives information of the shape of the tool, the shape of the workpiece, and the shape of the material from the input unit 21. Based on these information, the tool posture change unit performs a simulation to calculate if the structure of the machine tool will interfere with the workpiece. It calculates if the structure of the machine tool and workpiece will interfere with each other at the respective positions on the tool path for changing the tool posture. If the structure of the machine tool and workpiece interfere, change of the tool posture at that position is suspended.

Figure 2:
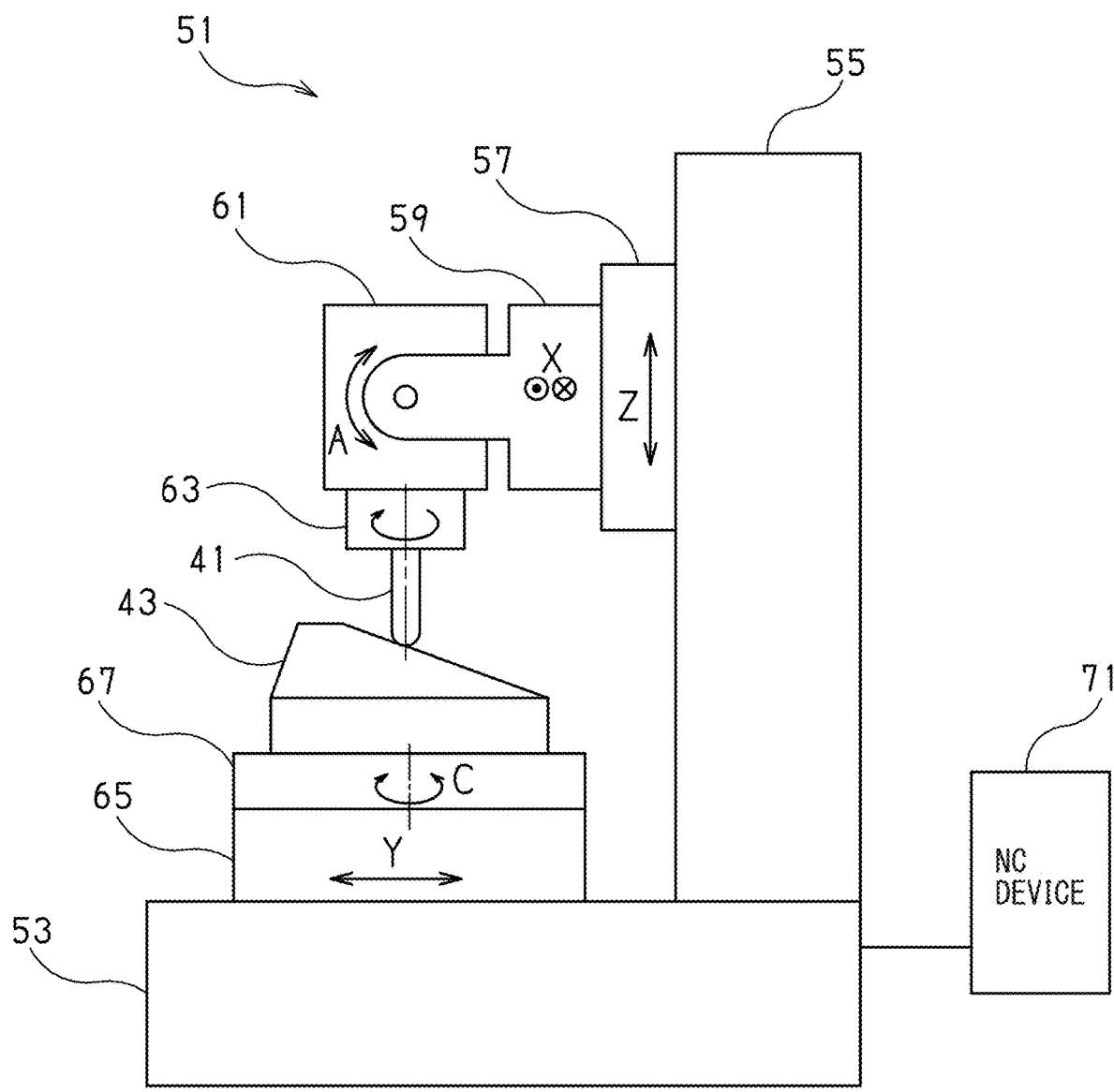
FIG. 2 is a side view of an NC machine tool using a machining program generated by the embodiment of the present invention.

FIG. 2 is an NC machine tool 51 for machining the workpiece 43 based on the machining program generated by the program generation device of the present invention. The NC machine tool 51 has a bed 53 serving as the base part, a column 55 providing standing from the bed 53, a saddle 57 moving in the Z-direction with respect to the column 55 by a not shown Z-axis linear feed axis, an X-slider 59 moving in the X-direction with respect to the saddle 57 by a not shown X-axis linear feed axis, a spindle head 61 rotating in the A-direction with respect to the X-slider 59 by a not shown A-axis rotational feed axis, a main spindle 63 supported to be able to rotate by a motor and bearing housed in the spindle head 61, a Y-slider 65 moving in the Y-direction with respect to the bed 53 by a not shown Y-axis linear feed axis, and a table 67 rotating in the C-direction with respect to the Y-slider 65 by a not shown C-axis rotational feed axis. The tool 41 is held at the main spindle 63 to be able to be changed. The workpiece 43 is placed on the table 67.

The operator inputs and runs the machining program at the NC device 71. The NC device 71 controls the feed axes X, Y, Z, A, and C of the NC machine tool 51 as described in the input machining program to make the tool 41 and workpiece 43 move relatively. Further, the NC device 71 controls the rotation of the main spindle 63 as described in the input machining program to make the tool 41 held at the main spindle 63 by the rotational speed described in the machining program. Due to this, the tool 41 cuts the workpiece 43.

Figure 3:
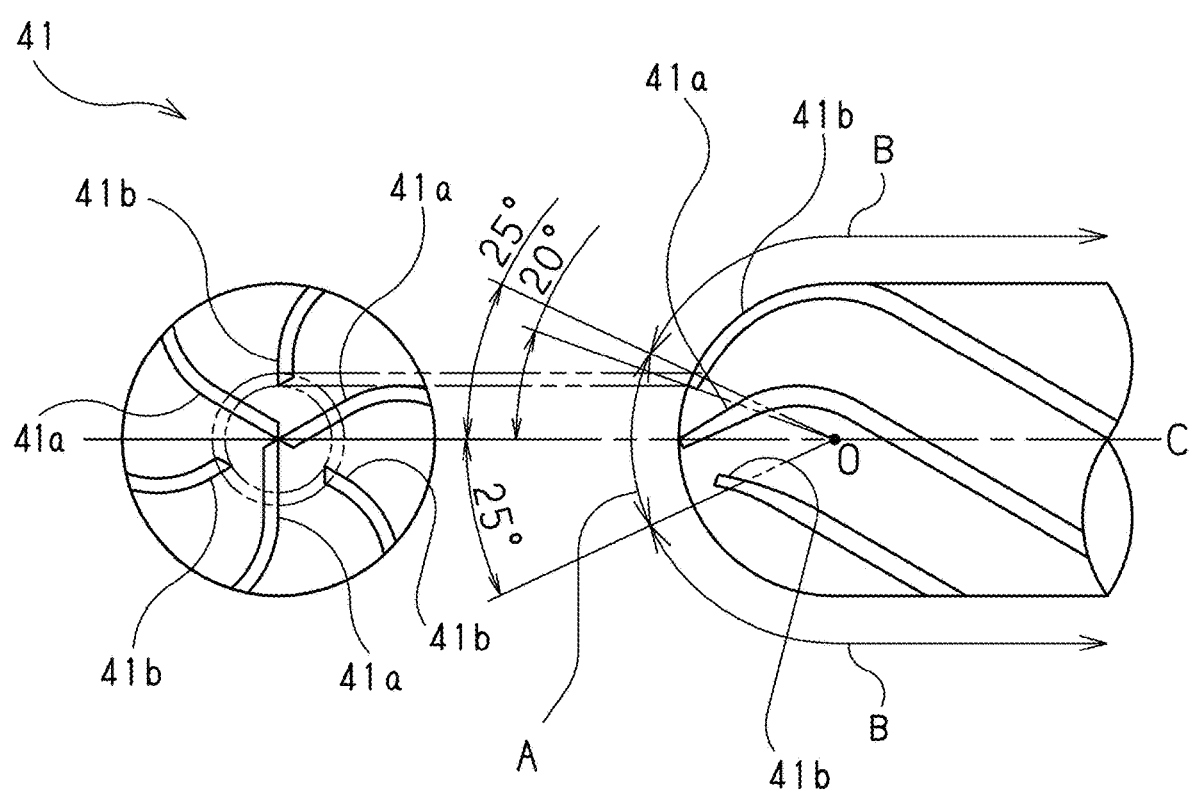
FIG. 3 is a view of a multi-edge tool used in a machining program generated by the embodiment of the present invention.

FIG. 3 is a tool 41 used in the present embodiment. The tool 41 is a ball end mill having six cutting edges. The tool 41 is formed with three cutting edges 41*a* extending to the tip of the tool. The other three cutting edges 41*b* of the tool 41 are formed so as not to reach the tip of the tool. For this reason, when the tool rotates, a region where there are three effective edges comprised of edges contributing to cutting and a region where there are six effective edges are formed. Various techniques may be considered for dividing the regions, but in the case of a ball end mill, the regions can be expressed by an angle formed between the line passing through the center of a sphere at the part where the path drawn by the cutting edge of the tip of the tool becomes a sphere and the rotational axis C of the tool. In the case of the tool 41, an angle of 20° can be said to be the boundary of the region where there are three effective edges and the region where there are six effective edges. The number of the effective edges comprised of edges contributing to cutting when the tool 41 rotates is three in the region of an angle with respect to the rotational axis C of the tool of less than the angle of 20°. There are six effective edges in the region of an angle with respect to the rotational axis C of the tool of the angle of 20° or more.

The machined surface of the workpiece 43 may be divided into a part machined by the region A of three effective edges and the part machined by the region B of six effective edges. However, if performing machining by an angle of the tool with respect to the rotational axis C near the angle of 20°, it is necessary to consider that both the region A of three effective edges and the region B of six effective edges will be utilized for machining the workpiece. In the present embodiment, the "machining condition" is in particular the feed speed and the objective is raising the feed speed. When setting the feed speed as the machining condition, when machining by a fast feed speed when there are six effective edges, if the region A of three effective edges is included, the speed becomes excessive at the region A of three effective edges and the possibility of the tool chipping rises. For this reason, near the angle of 20°, it is necessary to match with the slower feed speed of the feed speed of the three effective edges. Therefore, the region may be divided not at 20°, but at 25° considering the extra margin.

The contact region calculation unit 25 can find the angle formed by the rotational axis of the tool 41 and the normal of the machined surface of the workpiece and transfer information showing the region by this angle to the machining program generation unit 29. The machining program generation unit 29 refers to the storage unit 27. If the angle is 25° or more, it acquires the machining conditions for the region B of six effective edges while if is less than 25°, it acquires the machining conditions for the region A of three effective edges.

In the embodiments, the material of the workpiece 43 is die steel. The recommended feed speed of the ball end mill of FIG. 3 for die steel is 4800 mm/min with the region A of three effective edges, while is 9600 mm/min with the region B of six effective edges. The operator inputs the feed speed from the input unit 21 for each region of the tool and stores it in the storage unit 27.

Figure 4:
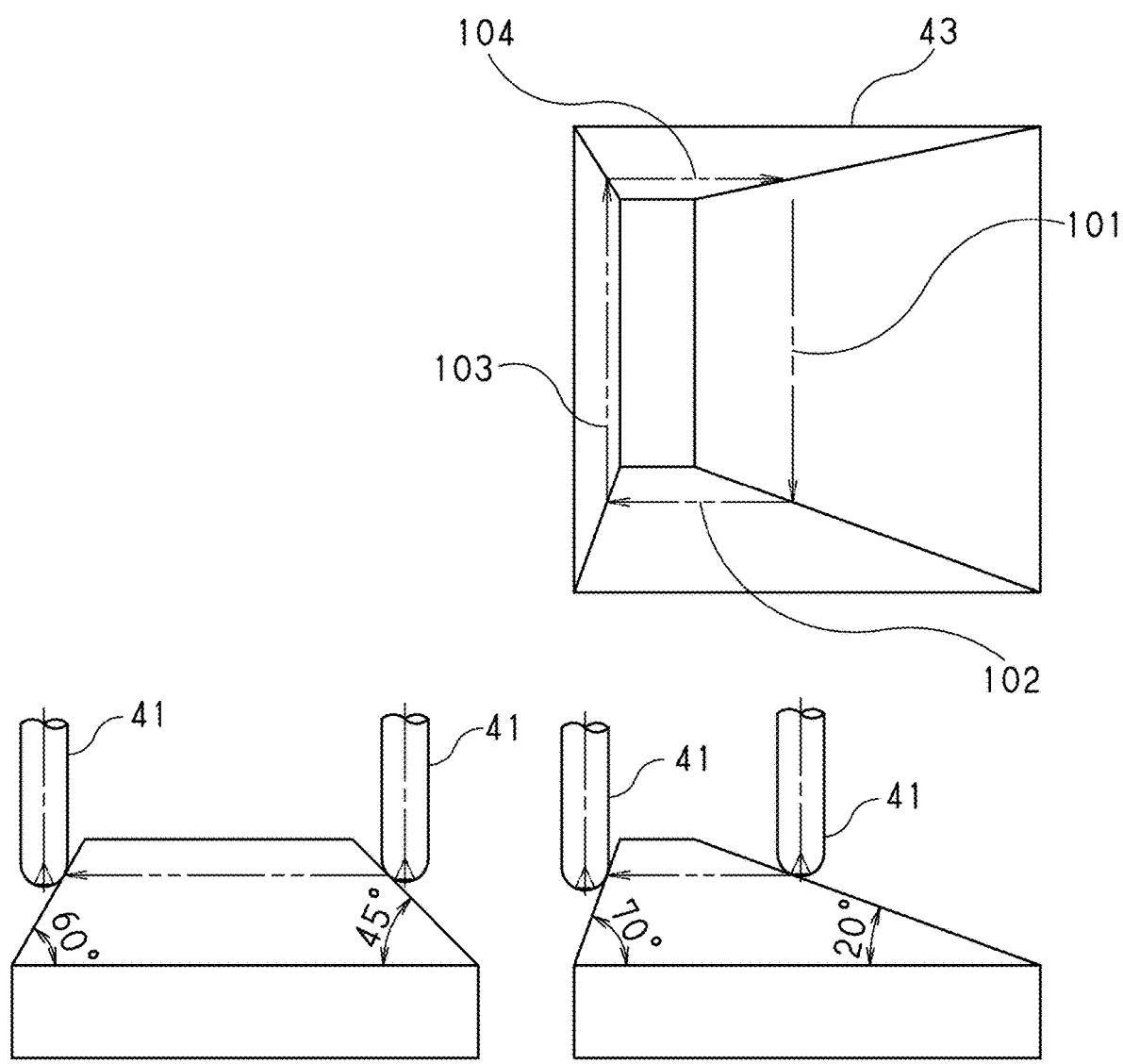
FIG. 4 is a view schematically showing movement of a tool in a case of working the present invention without changing the posture of the tool.

FIG. 4 shows an embodiment of three-axis machining in the case of generating a machining program performing contour machining on the workpiece 43 having slanted surfaces different in slant angles of the surfaces using X-, Y-, and Z-linear feed axes and not using the A and C rotational feed axes. In this case, the operator inputs information on the workpiece 43 having slanted surfaces, information on a tool 41, and information on the contour machining from the input unit 21. "Contour machining" is the process of making a tool move by an X-axis feed axis and a Y-axis feed axis and machining the workpiece 43 by a tool path drawing a contour. Machining is performed by a tool path corresponding to one turn of contour, then the tool is moved along a slanted surface downward by exactly the amount of pick feed, then machining is performed again so as to draw a contour at a height different in the X-axis and Y-axis. The routine performing machining by repeating this is called "contour machining".

The tool path generation unit 23 generates a tool path in the input information. FIG. 4 shows parts of the tool path generated shown by the tool paths 101, 102, 103, and 104 of contours of one turn of contour machining for explanation. In actuality, the tool path generation unit 23 also generates tool paths not shown in FIG. 4.

Next, the contact region calculation unit 25 calculates the region of the tool 41 contacting the workpiece 43. By calculation by the contact region calculation unit 25, machining by the region A of the three effective edges in the tool path 101 is found. Similarly, by calculation of the contact region calculation unit 25, machining by the region B of the six effective edges in the tool paths 102, 103, and 104 is found.

Next, the machining program generation unit 29 reads the feed speed from the storage unit 27, adds a command of the feed speed to the tool path, and generates a machining program. The tool path 101 is given a command for making the feed speed 4800 mm/min. The tool paths 102, 103, and 104 are given commands for making the feed speeds 9600 mm/min.

The operator inputs the generated machining program into the NC device 71 and runs it so as to perform machining by the NC machine tool 51. This performs machining by a machining program generated by the machining program generation device 11 and given a suitable feed speed for each tool path, so NC machine tool 51 can efficiently perform machining in a short time without tool damage. Even if the NC machine tool 51 performs machining using a machining program with the feed speed set to 4800 mm/min for all paths, the machining time ends up becoming longer. If the NC machine tool 51 performs machining using a machining program with the feed speed of the tool 41 set to 9600 mm/min for all paths, at the time of machining the tool path 101, the feed speed of the tool 41 will exceed the suitable value and the tool 41 can be chipped or the tool 41 will become shorter in lifetime.

FIG. 5 shows an embodiment of five-axis machining in the case of generating a machining program for contour machining by five-axis machining of the X-, Y-, Z-, A-, and C-axes of a workpiece 43 having slanted surfaces of the same slant angles of the surfaces as in FIG. 4. The processes by the tool path generation unit 23 and the contact region calculation unit 25 are similar to FIG. 4.

Before the machining program generation unit 29 outputs the machining program, the machining condition judgment unit 31 judges if there isn't room for improvement of the machining conditions. In an embodiment of three-axis machining, in the tool path 101, the workpiece 43 is machined by the region of three effective edges, so machining conditions with a slow feed speed are selected. Therefore, the machining condition judgment unit 31 judges that there is room for raising the feed speed in the tool path 101.

Next, the tool posture change unit 33 changes the tool posture and finds the tool posture and position where machining is possible by the region B of six effective edges in the tool path 101 which the machining condition judgment unit 31 judged. Based on the tool posture and position where machining is possible by the region B of six effective edges found by the tool posture change unit 33, the tool path generation unit 23 generates a tool path with an inclined tool posture at the rotational feed axis A such as shown in FIG. 5. The machining program generation unit 29 reading the newly generated tool path outputs a machining program slanting the tool posture and setting the feed speed to 9600 mm/min, since machining is performed by the region B of six effective edges even in the tool path 101. With this machining program, the NC machine tool 51 performs the machining by a fast feed speed by the region B of six effective edges even in the tool path 101, so there is no tool chipping and the machining time is shortened over the machining of FIG. 4.

The interference calculation unit 35 calculates whether portions of the tool other than the cutting edges or the main spindle and workpiece will interfere with each other before the tool posture change unit 33 sends out a change in tool posture and position to the tool path generation unit 23. In the example of FIG. 5, there is no interference, so the tool posture is changed.

In the present embodiment, the regions are divided into the two regions of the region A of three effective edges and the region B of six effective edges, but it is also possible to divide them into three regions including a region near the null point which matches the center of rotation of the tool and where the rotational speed of the cutting edges becomes zero besides the number of effective edges. In this case, the tool posture change unit 33 changes the tool posture so as to perform machining by the region A of three effective edges off from the null point when the region B of six effective edges cannot be selected due to interference.

REFERENCE SIGNS LIST

11 machining program generation device
21 input unit
23 tool path generation unit
25 contact region calculation unit
27 storage unit
29 machining program generation unit
31 machining condition judgment unit
33 tool posture change unit
35 interference calculation unit
41 tool
43 workpiece

The invention claimed is:

1. A machining program generation device generating a machining program machining a workpiece using a tool having a plurality of cutting edges, the device comprising:
   a storage unit storing a machining condition for each region of the tool, wherein the machining condition is set based on the number of effective edges of each region of the tool;
   a contact region calculation unit calculating a region of the tool contacting the workpiece at the time of machining from a shape of the workpiece, a shape of an edge part of the tool and a tool path; and
   a machining program generation unit generating a machining program based on the machining condition stored in the storage unit and the tool path corresponding to the region of the tool contacting the workpiece calculated by the contact region calculation unit.

2. The machining program generation device of claim 1, wherein the machining condition is a relative feed speed between the tool and the workpiece.

3. The machining program generation device of claim 2, further comprising a tool posture change unit changing a relative posture between the tool and the workpiece so that a region of the tool where the feed speed becomes faster contacts the workpiece in a range where the tool and the workpiece do not interfere.

4. The machining program generation device of claim 1, wherein the machining condition is a combination of a relative feed speed between the tool and the workpiece and a rotational speed of the tool.

5. The machining program generation device of claim 1, wherein the storage unit stores the region of the tool as a range of angle with respect to a rotational axis of the tool.

6. A machining method machining a workpiece using a tool having a plurality of cutting edges, the machining method comprising:
   determining machining conditions for each region of the tool, wherein the machining condition is set based on the number of effective edges of each region of the tool; and
   machining the workpiece using machining conditions corresponding to the region of the tool contacting the workpiece.

* * * * *